UNITED STATES PATENT OFFICE.

FREDERICK W. HOCHSTETTER, OF NEW YORK, N. Y., ASSIGNOR TO PAUL M. PIERSON, OF SCARBORO-ON-THE-HUDSON, NEW YORK.

COMPOSITION OF MATTER FOR RESTORING THE PICTURES ON FILMS.

1,149,443. Specification of Letters Patent. Patented Aug. 10, 1915.

No Drawing. Application filed August 16, 1913. Serial No. 785,091.

*To all whom it may concern:*

Be it known that I, FREDERICK W. HOCHSTETTER, a subject of the Emperor of Germany, and a resident of New York, county and State of New York, have invented a new and useful Composition of Matter for Restoring the Pictures on Films, of which the following is a full, clear, and exact specification.

This invention relates to a modified composition of matter for restoring the pictures on films as disclosed in my pending applications Serial Number 732,465, Serial Number 770,177, and Serial Number 771,689.

It is well known in the practice of exhibiting moving pictures that owing to the softness of the texture of the film upon which the pictures are produced the film and the photography of the pictures quickly become impaired by scratches and the collection of dust as well as being hardened and made very brittle when transmitted through the projecting machine. The clearness of the pictures are thereby frequently obscured to such an extent that they are practically worthless for further use.

My present invention has for its object primarily to overcome these objections by providing a composition of matter designed to be employed for treating moving picture films in such manner as to remove all dust from crevices or scratches, and all foreign substances from the surface of the film and at the same time restore the flexibility of the film. The high lights and shadows of the photography of the pictures and the transparency will thereby be entirely, or sufficiently restored so that the film may be repeatedly used for exhibition purposes.

My composition of matter consists of the following ingredients, and in the preferred form are combined in the proportions stated, viz:—glycerin by weight 8 ounces; gum camphor (U. S. P. strength) by weight 5 drams; alcohol (U. S. P. strength) by weight 2 ounces; sulfuric ether (U. S. P. strength) by weight ½ ounce.

The gum camphor is dissolved in the alcohol after being poured into a bottle, or into any suitable container adapted to be closed to prevent evaporation of the contents. The sulfuric ether is then added to the solution, and after the ingredients are mingled together, the glycerin is added. By first mixing the ether with the solution of alcohol and camphor these ingredients will usually combine with the glycerin, but as sulfuric ether is normally only slightly soluble in glycerin it may at times tend to separate therefrom, in which instance an emulsion is formed when all of the ingredients are mingled by being thoroughly agitated.

In using the composition for restoring the pictures on films the mixture, or the emulsion of the ingredients is applied to the surfaces of the film to form a coating thereon through the medium of a pad of chamois skin, or other soft material which has been previously saturated with a quantity of the ingredients. By then frictionally rubbing the coating in any suitable manner the crevices of the scratches in the film and the photography of the pictures thereon will be freed of all foreign substances as well as the flexibility of the film restored by absorbing a quantity of the ingredients. Thus moving picture films when blemished in the manner above described may be restored sufficiently for repeated use.

Having thus described my invention, I claim as new and desire to secure by Letters Patent:—

1. The herein described composition of matter, consisting of glycerin, alcohol, gum camphor, and sulfuric ether, substantially as described and for the purpose specified.

2. A restorative for moving picture films comprising in substantially the following proportions, glycerin eight ounces, gum camphor five drams, alcohol two ounces, and sulfuric ether one-half ounce, substantially as described and for the purpose specified.

This specification signed and witnessed this fifteenth day of August A. D. 1913.

FREDERICK W. HOCHSTETTER.

Witnesses:
ROBT. B. ABBOTT,
FINN SIMMONS.